(12) United States Patent
Caine (10) Patent No.: US 6,202,265 B1
(45) Date of Patent: Mar. 20, 2001

(54) TOOL-LESS FASTENER FOR COMPUTER CONNECTIONS

(76) Inventor: Patrick J. Caine, 7607 E. Sunset Dr., Wonder Lake, IL (US) 60097

( * ) Notice: Subject to any disclaimer, the term of this patent is extended or adjusted under 35 U.S.C. 154(b) by 0 days.

(21) Appl. No.: 09/344,534

(22) Filed: Jun. 25, 1999

(51) Int. Cl.[7] ............................................... F16B 21/00
(52) U.S. Cl. ............................ 24/453; 24/514; 24/535; 24/569; 411/70
(58) Field of Search .................... 24/453, 514, 535, 24/569; 411/70

(56) References Cited

U.S. PATENT DOCUMENTS

| | | |
|---|---|---|
| 2,365,372 | 12/1944 | Allen . |
| 2,699,214 * | 1/1955 | Sweet ....................................... 24/535 |
| 3,192,820 | 7/1965 | Pitzer . |
| 3,534,650 * | 10/1970 | Kubokawa ............................... 24/453 |
| 3,709,088 * | 1/1973 | Pitzer ....................................... 411/70 |
| 3,901,298 * | 8/1975 | Eby ......................................... 145/52 |
| 5,377,951 | 1/1995 | Johnson et al. . |
| 5,495,389 | 2/1996 | Dewitt et al. . |
| 5,564,667 | 10/1996 | Copeland et al. . |
| 5,598,318 | 1/1997 | DeWitt et al. . |
| 5,598,612 | 2/1997 | Sheldon . |

* cited by examiner

Primary Examiner—Victor N. Sakran
(74) Attorney, Agent, or Firm—Michael R. McKenna

(57) ABSTRACT

A tool-less fastener for use in connecting a computer cable to either a computer or peripheral equipment. An elongated rod with an external expandable sleeve fits into a standard threaded hole and then expanded to fasten the cable to the equipment without the need for a screwdriver or other tool. The tool-less fastener may be independent of or interconnected to the computer cable.

34 Claims, 3 Drawing Sheets

TOOL-LESS FASTENER FOR COMPUTER CONNECTIONS

BACKGROUND OF THE INVENTION

This invention relates to a tool-less fastener, for use in connecting a computer cable to one of a computer port connection and a peripheral port connection. It comprises an elongated rod having a central axis, a first end, and a second end; means for axially biasing the rod which is disposed proximate to the first end; means for restricting axial movement which is disposed proximate to the second end; and a resilient sleeve having an interior recess therethrough that is suitably sized to accommodate the rod and has a relaxed maximum outer transverse dimension that is less than the smallest transverse dimension of the elongated receiving recess. The sleeve is disposed around the rod between the means for axially biasing and the means for restricting axial movement.

The means for axially biasing is movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing. The deforming compressive pressure compresses the sleeve axially and expands at least a portion of the sleeve radially relative to the central axis of the rod to a deformed maximum outer transverse dimension that is greater than the smallest transverse dimension of the elongated receiving recess.

There is a need for a reliable, efficient and simple means to secure the cabling between a computer and its various peripherals, whereby a functional system is completed. Existing technology for a cable connector utilizes a screw connection with a threaded borehole on the computer port connection or the peripheral port connection, and a rotatable screw integral with the cable holder. Often the space available to work at making the connections is severely limited and it is difficult if not impossible to turn the screw to make the connection.

To alleviate this problem, and others which will become apparent from the disclosure which follows, the present invention conveniently provides for a tool-less cable fastener. The present invention eliminates the need for tools and eliminates the need to have visual contact with the connection site. And it is possible to make the connection even where the space available to work at making the connections is severely limited. Once electrical connectivity is established, a flip of the lever arm establishes a physical interlock. The tool-less fastener of the instant invention is reliable, reusable and efficient.

In a preferred embodiment of the tool-less fastener of this important invention, the following components are provided: an elongated rod, with dimensions that will vary with application; attached to the rod is a lever mechanism that will rotate to a locking position due to a cam action and a flat surface incorporated on to the face of the lever; and a cupped washer that allows free travel over the outside diameter of the rod selected for the application. This washer is placed on the rod with the concave surface of the cup facing an elastic sleeve. The elastic sleeve is sized to fit closely over the outside diameter of the rod and of a length extending between two washers. The cupped spring washer may be pressed over an end of the rod until it snaps in place in a circumferential groove. This washer is placed on the rod with the concave surface of the cup facing the elastic sleeve.

The movement of the lever and the subsequent cam action will result in compression of the elastic sleeve between the two washers. A flat section incorporated on the peripheral edge of the lever mechanism can serve to lock the lever in place. The compression causes the elastic sleeve to expand inside of a smooth, threaded, or radially ribbed recess in which it is placed. This results in locking the intended cable in place.

A modular design for this fastener will allow for the custom assembly of the fastener as needed by an end user through stocking of a variety of components to have on hand.

The design allows for simple integration into existing cable manufacturing platforms. The design is also compatible with existing cable replacement applications.

Another advantage of having a tool-less fastener of the type disclosed herein is that there is no loose hardware that can be dropped into a conductive environment and cause component failure or binding of mechanical components such as a cooling fan blade.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The present invention relates to a tool-less fastener for use in connecting a computer cable to one of a computer port connection and a peripheral port connection. An elongated rod having a central axis, a first end, and a second end is provided, along with means for axially biasing the rod which is disposed proximate to the first end. Furthermore, means for restricting axial movement which disposed proximate to the second end and a resilient sleeve having an interior recess therethrough that is suitably sized to accommodate the rod are taught.

The resilient sleeve has a relaxed maximum outer transverse dimension that is less than the smallest transverse dimension of the elongated receiving recess. The sleeve is disposed around the rod between the means for axially biasing and the means for restricting axial movement.

The means for axially biasing is movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing. The deforming compressive pressure compresses the sleeve axially and expands at least a portion of the sleeve radially relative to the central axis of the rod to a deformed maximum outer transverse dimension that is greater than the smallest transverse dimension of the elongated receiving recess. The tool-less fastener may be independent of or integral with the holder of the computer cable.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawing and descriptive matter in which there is illustrated preferred embodiments of the invention.

BRIEF DESCRIPTION OF THE DRAWINGS

Preferred embodiments of the invention are described hereinafter with reference to the accompanying drawing wherein.

DETAILED DESCRIPTION OF THE INVENTION

The preferred embodiments depicted in the drawing include a tool-less fastener, for use in connecting a computer cable to one of a computer port connection and a peripheral port connection.

The discussion that follows, without limiting the scope of the invention, will refer to the invention as depicted in the drawing, showing a tool-less fastener 1, for use in connecting a computer cable 5 to one of a computer port connection 12 and a peripheral port connection 14. The computer cable 5 has a connection holder 4 disposed on a terminal end. Each of the computer port connection and the peripheral port connection has an elongated receiving recess 6 (as they are interchangeable for the purpose of explaining the functioning of the tool-less fastener only one identifying number has been assigned).

The tool-less fastener comprises an elongated rod 2 having a central axis, a first end 2a, and a second end 2b; means for axially biasing the rod 16 which is disposed proximate to the first end; means for restricting axial movement 18 which is disposed proximate to the second end; and a resilient sleeve 7 having an interior recess 7a therethrough that is suitably sized to accommodate the rod 2 and has a relaxed maximum outer transverse dimension that is less than the smallest transverse dimension of the elongated receiving recess. The sleeve 7 is disposed around the rod 2 between the means for axially biasing 16 and the means for restricting axial movement 18.

Figure 3:
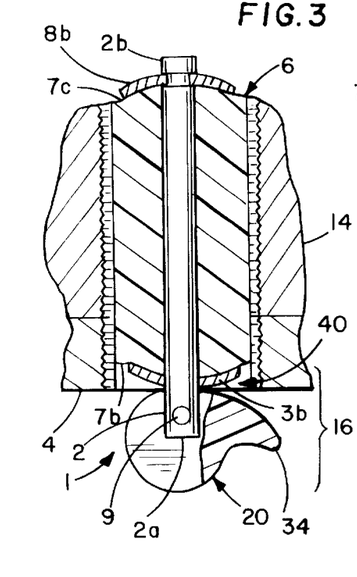
FIG. 3 is a side elevation view of the tool-less fastener of the first preferred embodiment of the present invention disposed in a first position where the sleeve, disposed in a peripheral port connection recess and the hole of the connection holder, is relaxed.
Figure 4:
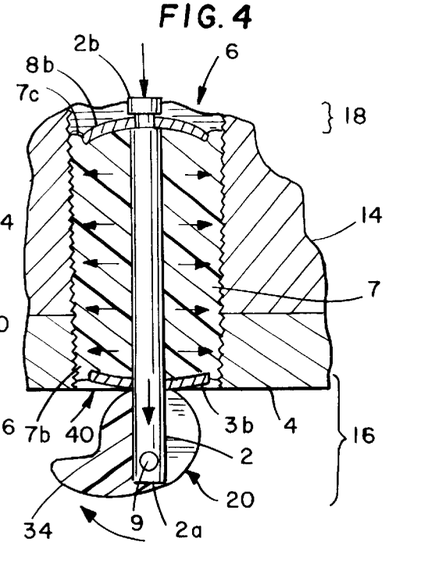
FIG. 4 is a side elevation view of the tool-less fastener of the first preferred embodiment of the present invention with the cam disposed in the second position whereby the sleeve is compressed axially and expanded radially to effectuate a connection between the hole of the holder and the recess of the peripheral port connection to secure the cable to the associated peripheral.
Figures 7, 8:
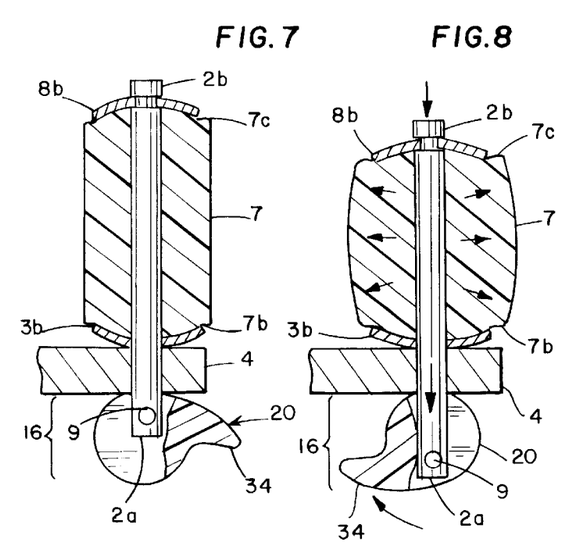
FIG. 7 is a side elevation view of a the tool-less fastener of the second preferred embodiment of the present invention disposed in a first position where the sleeve is relaxed.
FIG. 8 is a side elevation view of the tool-less fastener of the second preferred embodiment of the present invention with the cam disposed in the second position whereby the sleeve is compressed axially and expanded radially to effectuate a connection between the fastener extending from the holder and the recess of one of the peripheral port connection and the computer port connection to secure the cable to the object.

The means for axially biasing is movable between a first position in which the sleeve is relaxed having a first pressure that does not substantially exceed a nominal compressive pressure applied to the sleeve by the means for axially biasing, as shown in FIGS. 3 and 7, and a second position in which a deforming compressive pressure is applied to the sleeve by the means for axially biasing, as shown in FIGS. 4 and 8. The deforming compressive pressure compresses the sleeve axially and expands at least a portion of the sleeve radially relative to the central axis of the rod to a deformed maximum outer transverse dimension that is greater than the smallest transverse dimension of the elongated receiving recess 6.

Thus, the second end 2b of the rod 2 with the relaxed sleeve disposed around it can be projected from the connection holder 4 of the computer cable 5 to the receiving recess 6 of one of the computer port connection 12 and the peripheral port connection 14 when the means for axially biasing 16 is disposed in the first position, as shown in FIGS. 3 and 7. The connection holder 4 of the computer cable can be releasably connected to the receiving recess 6 of one of the computer port connection and the peripheral port connection when the means for axially biasing is disposed in the second position, as shown in FIGS. 4 and 8.

Referring to FIG. 3, the means for biasing 16 may comprise a first contact element (shown in the drawing as the first washer 3) having a central aperture 3a and a mechanism 20 that is rotatingly attached to the rod for axial movement with respect to the rod. The first contact element may further be disposed around the rod between the sleeve 7 and the rotating mechanism (while a cam mechanism 20 is show in the drawing, an available substitute could be used). An alternative would be to provide a means to rotate a threaded rod while binding the movement of the first contact element so that it moved axially relative to the rod to bias the sleeve.

Figures 21, 22, 23:
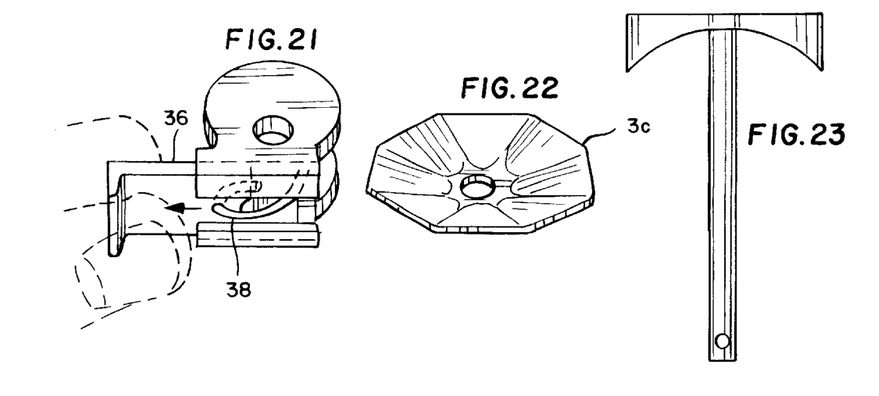
FIG. 21 is a perspective view of another preferred embodiment of the cam mechanism of the present invention showing a parallel set of cam wheels and an extensible lever arm extending from the parallel set of cam wheels.
FIG. 22 shows a perspective view of a belleville washer of the tool-less fastener of the present invention from the concave side which may be employed in the tool-less fastener of the present invention.
FIG. 23 is a side elevation view of a preferred embodiment of the elongated rod of the tool-less fastener of the present invention showing an elongated rod with means for restricting axial movement integrally disposed proximate to the second end of the rod.

In a preferred embodiment of the present invention, the means for biasing 16 comprises a first contact element having a central aperture and a cam mechanism 20. The cam mechanism is operatively attached to the rod 2, and the first contact element is disposed around the rod between the sleeve 7 and the cam mechanism 20. Moreover, the first contact element may comprise a first washer 3, i.e. a disk or ring. Preferably, the first contact element is a first cupped washer 3b having a concave surface disposed proximate to the sleeve 7 and the concave surface of the first cupped washer is in a face to face relationship with a proximate end 7b of the sleeve 7. Referring to FIG. 22, the first washer may comprise a Belleville washer 3c with a concave surface disposed proximate to the sleeve 7.

Figure 11:
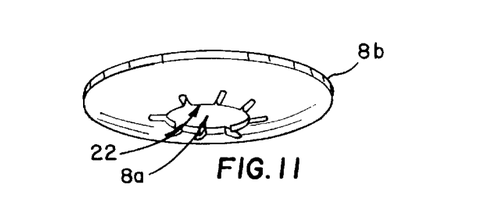
FIG. 11 is a perspective view of a cupped washer of the present invention showing a central aperture of the washer with a plurality of inwardly directed radial fins.
Figures 12, 13:
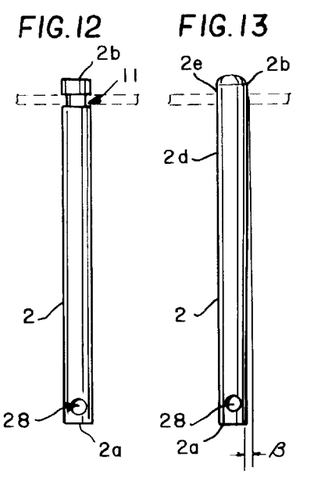
FIG. 12 is a side elevation view of a preferred embodiment of the elongated rod of the tool-less fastener of the present invention showing an elongated rod with the circumferential groove disposed about the second end of said rod for accommodating a washer.
FIG. 13 is a side elevation of another preferred embodiment of the elongated rod of the tool-less fastener of the present invention showing the rod having a taper extending along at least one segment of its length tapering toward the first end of the rod.

In another preferred embodiment of the tool-less fastener of the present invention, the rod 2 is cylindrical with a circumferential groove 11 disposed proximate to the second end 2b, as shown in FIG. 12. The means for restricting axial movement may further comprise a second contact element (shown in the drawing as a second washer 8) having a central aperture 8a. The central aperture 8a may have a plurality of inwardly directed radial fins 22, as shown in FIG. 11, that are flexibly moveable between a static position in which the fins 22 are inwardly directed radially and a dynamic position in which fins flex axially relative to the central axis of the rod to allow one of the first end 2a and the second end 2b of the rod 2 to be inserted in to the central aperture 8a. The plurality of fins 22 are sufficiently resilient to return to the static position when the central aperture is aligned with the circumferential groove 11 of the rod 2. In this way, the rod 2 can be inserted in to the central aperture of the second contact element axially flexing the plurality of inwardly directed radial fins 22 until the circumferential groove 11 of the rod 2 is aligned with the central aperture allowing the plurality of fins to elastically regain the static position thereby securing the second contact element axially. Preferably, the distance between opposing fins will be less than the largest transverse dimension of the second end of the rod and less than the transverse dimension of the circumferential groove. In preferred form, the second contact element comprises a second washer 8.

Figure 14:
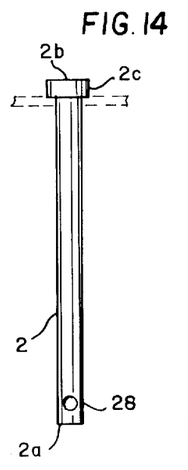
FIG. 14 is a side elevation of another preferred embodiment of the elongated rod of the tool-less fastener of the present invention showing a shoulder of increased radial dimension disposed proximate to the second end thereof.

In another preferred embodiment of the present invention as shown in FIG. 14, the means for restricting axial movement comprises a second contact element, in phantom, having a central aperture of predetermined radial dimension and the rod 2 is generally cylindrical with a shoulder 2c of increased radial dimension disposed proximate to the second end 2b. The shoulder 2c has an outer radial dimension greater than the predetermined radial dimension of the central aperture 8a. The second contact element can be disposed around the rod 2 between the sleeve 7 and the shoulder 2c. Alternately, the second contact element may be made integral to the second end 2b of the rod 2.

In another preferred embodiment of the tool-less fastener, the means for restricting axial movement comprises a second contact element having a central aperture of predetermined radial dimension and the rod 2 has a taper extending along at least one segment 2d of its length tapering toward the first end 2a of the rod and disposed proximate to the second end 2b of the rod, as shown in FIG. 13. The at least one segment 2d of the rod has a section 2e with an outer radial dimension greater than the predetermined radial dimension of the central aperture 8a for limiting the second contact element from further axial movement in the direction of the second end 2b of the rod.

Preferably, the contact element comprises a second washer 8 which may be a second cupped washer 8b having a concave surface disposed proximate to the sleeve 7. Such concave surface of the second cupped washer may be in a face to face relationship with a distal end 7c of the sleeve 7.

Another preferred aspect of the tool-less fastener of the present invention provides that the second end 2b of the rod 2 be rounded, as shown in FIG. 13, to facilitate insertion into the elongated recess 6.

Figures 1, 2:
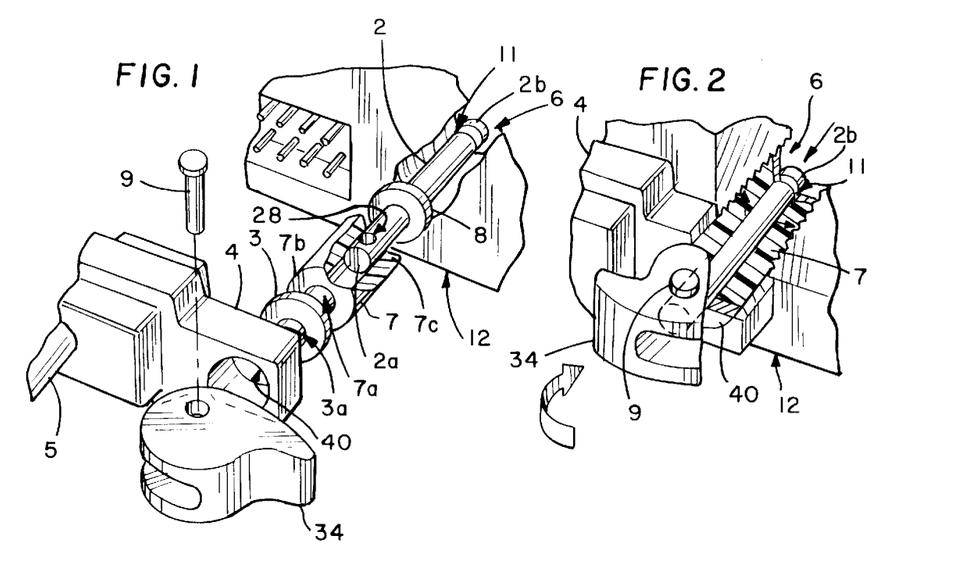
FIG. 1 is a cut-away exploded perspective view of a first preferred embodiment of the tool-less fastener of the present invention showing the central rod with a circumferential recess disposed on one end and a transverse borehole on the other end for receiving a cam shaft, and with a second washer disposed around the shaft and a cylindrical sleeve disposed away from the rod adjacent to a first washer, and further showing a cam mechanism that can be secured to the rod by a camshaft and further showing a cable connection holder with a hole for receiving the resilient sleeve.
FIG. 2 is a cut-away perspective view of the first preferred embodiment of the tool-less fastener of FIG. 1, with the fastener inserted in the hole of the connection holder of the computer cable and the elongated receiving recess of the computer port connection, and with the cam wheel disposed in a second position whereby compressive forces are applied to the sleeve to secure same within said hole and recess.
Figures 15, 16:
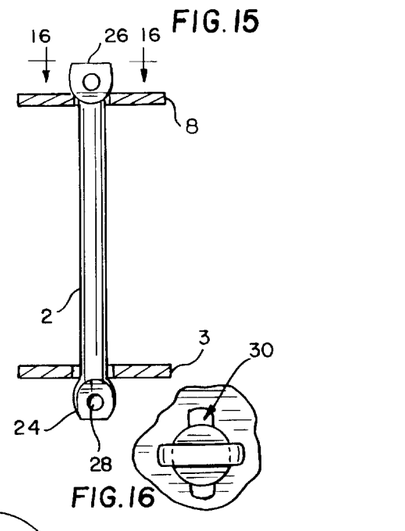
FIG. 15 is a side elevation view of the another preferred embodiment of the elongated rod of the tool-less fastener of the present invention showing the rod as cylindrical in shape with a first flattened end and a second flattened end, further showing the disposition of a first washer and a second washer both relative to said flattened ends, respectively.
FIG. 16 is a top plan view taken along the line 16—16 of FIG. 15 showing a notched central aperture with maximum transverse dimension greater than any maximum transverse dimension of the flattened end of the rod.
Figure 17:
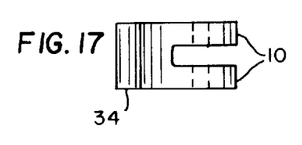
FIG. 17 is a top plan view of the cam mechanism showing a parallel set of cam wheels and a lever arm extending from the parallel set of cam wheels.

Referring to FIG. 15, the rod 2 is cylindrical with a first flattened end 24 and a second flattened end 26. The first flattened end has a transverse opening 28 for receiving a camshaft 9. The means for biasing comprises a camshaft 9 and a cam mechanism 20, as shown in FIG. 1. The cam mechanism is operatively connected to the camshaft, and the means for biasing and the means for restricting axial movement comprise, respectively, a first contact element and a second contact element. Referring to FIG. 16, each of the first contact element and the second contact element has a notched central aperture 30 with one maximum transverse dimension greater than a maximum transverse dimension of the flattened end of the rod. The first contact element is disposed around the rod 2 between the sleeve 7 and the cam mechanism 20, and the second contact element is disposed around the rod between the sleeve 7 and the second flattened end 26.

As shown in FIGS. 1, 2, 5–6, 17–18, and 21, the tool-less fastener of this important invention includes the rod having a transverse opening 28 for receiving a camshaft 9 and the means for biasing having a camshaft and a cam mechanism including a parallel set of cam wheels 10. The cam wheels are operatively connected to the camshaft 9 which is operatively connected to the transverse opening 28 in the rod 2.

Figure 18:
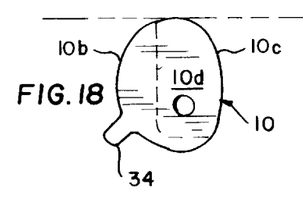
FIG. 18 is a side elevation view of the cam mechanism of FIG. 17 showing a peripheral edge with the first segment having a constant radius of curvature and a second segment of varying radii of curvature relative to the cam hole, said cam wheels being of a suitable size to allow it to be grasped between the fingertips of the user.
Figure 19:
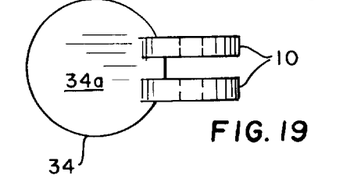
FIG. 19 is a top plan view of another preferred embodiment of the cam mechanism of the present invention showing a parallel set of cam wheels and a lever arm extending from the parallel set of cam wheels, said lever arm having a flattened profile, preferably with parallel surfaces, of a suitable size to allow it to be grasped between the fingertips of the user.

As best shown in FIG. 18, each of the parallel set of cam wheels 10 comprises a peripheral edge 10a having a first segment 10b with a constant radius of curvature and a second segment 10c of varying radii of curvature relative to the cam hole 32. The radial dimension of the first segment 10b is at least as great as the largest radial dimension of the second segment 10c, and an exterior surface 10d of suitably sized is provided to allow the cam wheels 10 to be grasped between the finger tips of a user.

Figure 20:
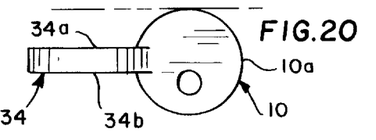
FIG. 20 is a side elevation view of the preferred embodiment of the cam mechanism of FIG. 19 showing a parallel set of cam wheels and a lever arm extending from the parallel set of cam wheels, said lever arm having a flattened profile, preferably with parallel surfaces, of a suitable size to allow it to be grasped between the fingertips of the user.

Preferably, the cam mechanism includes a parallel set of cam wheels and a lever arm 34 extending from the parallel set of cam wheels 10 to facilitate rotation of the cam wheels. As best shown in FIG. 20, the lever arm 34 has a first exterior surface 34a that is parallel to a second exterior surface 34b. The first and second exterior surfaces are of suitable size to allow the lever arm to be grasped between the finger tips of a user.

Another preferred embodiment of the tool-less fastener includes an extensible lever arm 36 projecting from a parallel set of cam wheels 10 to facilitate rotation of the cam wheels. The extensible lever arm 36 is movable between a first position in which the arm is retracted and a second position in which the arm is fully extended, as shown in FIG. 21. A spring 38 or like device may be employed to return the extensible lever arm 36 to its retracted position. Preferably, the second position of the extensible lever arm 36 is of suitable size to allow the lever arm to readily actuated.

Figure 9:
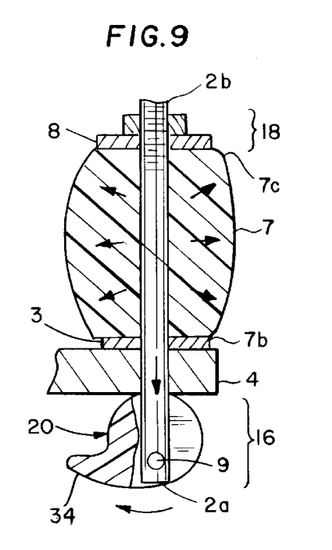
FIG. 9 is a side elevation view of a third preferred embodiment of the tool-less fastener of the present invention showing the sleeve disposed between a first and second washer with the second washer being retained in place relative to the rod by a bolt threaded to the rod.
Figure 10:
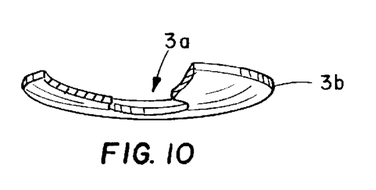
FIG. 10 is a cut-away view of a cupped washer of the present invention viewed in perspective from the convex side.

The tool-less fastener operates by the introduction of radial forces, shown by radiating arrows in FIGS. 4, 8, and 9, exerted by the deformed sleeve upon the recesses into which it is disposed to effectuate restricting axial movement. Preferably, the elongated recess has an interior surface comprising one of a rough surface and a smooth surface. Such rough surface may be threaded, as shown in FIG. 2 for example, or knurled. Moreover, the sleeve may have a textured exterior surface.

As shown in FIGS. 1, 3, 5, 7, and 9 of the drawing, the relaxed sleeve has a cylindrical outer shape and the elongated receiving recess has a generally cylindrical shape.

Figures 5, 6:
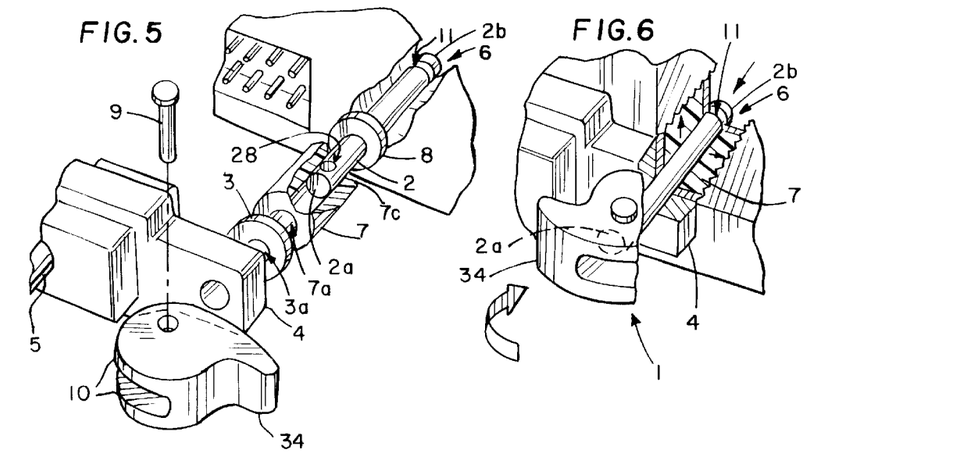
FIG. 5 is an cut-away exploded perspective view of a second preferred embodiment of the tool-less fastener of the present invention showing the central rod with circumferential recess disposed on one end and a transverse bore hole on the other to receive a cam shaft, a second washer disposed around the shaft, a cylindrical sleeve disposed away from the rod adjacent to a first washer, and further showing a cam mechanism that can be secured to the rod by a camshaft also shown as a cable connection holder with a hole for receiving the resilient sleeve.
FIG. 6 is a cut-away perspective view of a second preferred embodiment of the tool-less fastener of FIG. 5 with the fastener connected to the connection holder of the computer cable and extending therefrom to the elongated receiving recess of the computer port connection and with the cam wheel disposed in the second position whereby compressive forces are applied to the sleeve to secure same within said recess, to secure the cable to the computer.

Referring to FIGS. 1 and 5, the connection holder 4 comprises a flange.

Preferably, the materials of construction should be non-conductive. A polycarbonate material is suitable for the elongated rod and cam mechanism. Buna-N (or Vitol made by Dow Chemical) may be used for the resilient sleeve. Suitable substitutes will be apparent to those skilled in the art.

In a second preferred embodiment of the present invention, as shown in FIGS. 1–4, the tool-less fastener is independent of the computer cable. The connection holder 4 of the computer cable 5 has a hole 40 for receiving the resilient sleeve 7, as best shown in FIG. 1. Additionally, the relaxed maximum outer transverse dimension of the resilient sleeve is less than the smallest transverse dimension of the hole 40, and the deformed maximum outer transverse dimension is greater than the smallest transverse dimension of the hole 40. The rod with the relaxed sleeve disposed around it can be introduced to the hole 40 of the connection holder of the computer cable and the receiving recess of one of the computer port connection and the peripheral port connection when the means for axially biasing is disposed in the first position, and the connection holder of the computer cable can be releasably connected to the receiving recess of one of the computer port connection and the peripheral port connection by the radial forces of the deformed sleeve when the means for axially biasing is disposed in the second position.

Preferably, the smallest transverse dimension of the hole 40 corresponds generally to the smallest transverse dimension of the elongated receiving recess 6.

In a preferred embodiment of the present invention, a tool-less fastener, for use in connecting a computer cable to one of a computer port connection and a peripheral port connection is taught. The computer cable 5 has a connection holder 4 disposed on a terminal end thereof, and each of the computer port connection and the peripheral port connection has an elongated receiving recess 6. The fastener comprises the following elements: an elongated rod 2 having a central axis, a first end 2a, a second end 2b, and a transverse opening 28 proximate to the first end 2a; means for axially biasing 16 the rod 2 which is disposed proximate to the first end 2a, where the means for biasing includes a camshaft 9 and a cam mechanism 20 including a parallel set of cam wheels 10 that are operatively connected to the camshaft 9, with the camshaft being operatively connected to the transverse opening 28 in the rod 2, and attached thereto; and a first cupped washer 3b having a central aperture 3a and a concave surface disposed proximate to the sleeve 7, said first cupped washer is disposed around the rod between the sleeve and the cam mechanism; means for restricting axial movement 18 which is disposed proximate to the second end 2b; and a resilient sleeve 7 having an interior recess 7a therethrough that is suitably sized to accommodate the rod and having a relaxed maximum outer transverse dimension that is less than the smallest transverse dimension of the elongated receiving recess 6.

The sleeve 7 is disposed around the rod 2 between the means for axially biasing and the means for restricting axial movement. The means for axially biasing is movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing.

The deforming compressive pressure compresses the sleeve axially and expands at least a portion of the sleeve 7 radially relative to the central axis of the rod 2 to a deformed maximum outer transverse dimension that is greater than the smallest transverse dimension of the elongated receiving recess 6. Thus, the second end 2b of the rod with the relaxed sleeve disposed around it can be projected from the connection holder 4 of the computer cable to the receiving recess 6 of one of the computer port connection and the peripheral port connection when the means for axially biasing is disposed in the first position, and the connection holder 4 of the computer cable can be releasably connected to the receiving recess 6 of one of the computer port connection 12 and the peripheral port connection 14 when the means for axially biasing is disposed in the second position.

In another preferred embodiment of the tool-less fastener of the present invention, the fastener extends from a computer cable 5, for use in connecting the computer cable to one of a computer port connection and a peripheral port connection. The computer cable has a connection holder 4 disposed on a terminal end thereof, and each of the computer port connection and the peripheral port connection having an elongated receiving recess 6. The fastener further comprises an elongated rod 2 having a central axis, a first end, a second end, and a transverse opening 28 proximate to the first end 2a; the connection holder 4 of the computer cable 5 has a hole 40 for receiving a resilient sleeve 7; means for axially biasing the rod which is disposed proximate to the first end 2a including a camshaft 9 and a cam mechanism 20 including a parallel set of cam wheels 10, where the cam wheels are operatively connected to the camshaft, and the camshaft is operatively connected to the transverse opening in the rod, and attached to the rod, and a first cupped washer 3b having a central aperture 3a and a concave surface disposed proximate to the sleeve 7 is provided. The first cupped washer 3b is disposed around the rod between the sleeve 7 and the cam mechanism 20. Means for restricting axial movement which is disposed proximate to the second end 2b, and a resilient sleeve 7 having an interior recess 7a therethrough that is suitably sized to accommodate the rod 2 and having a relaxed maximum outer transverse dimension that is less than the smallest transverse dimension of the elongated receiving recess 6 are further provided.

The sleeve 7 is disposed around the rod 2 between the means for axially biasing and the means for restricting axial movement. The means for axially biasing is movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing.

The relaxed maximum outer transverse dimension of the resilient sleeve 7 is less than the smallest transverse dimension of the hole 40. The deforming compressive pressure compresses the sleeve axially and expands at least a portion of the sleeve radially relative to the central axis of the rod to a deformed maximum outer transverse dimension that is greater than the smallest transverse dimension of the elongated receiving recess 6, and the deformed maximum outer transverse dimension is greater than the smallest transverse dimension of the hole 40.

Accordingly, the second end 2b of the rod 2 with the relaxed sleeve is disposed around it can be projected from the connection holder 4 of the computer cable 5 to the receiving recess 6 of one of the computer port connection and the peripheral port connection when the means for axially biasing is disposed in the first position, and the connection holder 4 of the computer cable can be releasably connected to the receiving recess 6 of one of the computer port connection and the peripheral port connection when the means for axially biasing is disposed in the second position. The rod with the relaxed sleeve disposed around it can be introduced to the hole of the connection holder of the computer cable and the receiving recess of one of the computer port connection and the peripheral port connection when the means for axially biasing is disposed in the first position, and the connection holder of the computer cable can be releasably connected to the receiving recess of one of the computer port connection and the peripheral port connection by the radial forces of the deformed sleeve when the means for axially biasing is disposed in the second position.

Preferably, the means for restricting axial movement comprises a second contact element having a central aperture 8a. The central aperture has a plurality of inwardly directed radial fins 22 with the distance between opposing fins being less than the largest transverse dimension of the second end 2b of the rod and less that the transverse dimension of the circumferential groove 11. The plurality of fins is flexibly moveable between a static position in which the fins are inwardly directed radially and an dynamic position in which fins flex axially relative to the central axis of the rod to allow one of the first end and the second end of the rod to be inserted in to the central aperture, and the plurality of fins 22 is sufficiently resilient to return to the static position when the central aperture 8a is aligned with the circumferential groove 11 of the rod 2, hence, the rod can be inserted in to the central aperture 8a of the second contact element axially flexing the plurality of inwardly directed radial fins 22 until the circumferential groove of the rod is aligned with the central aperture allowing the plurality of fins to elastically regain the static position thereby securing the second contact element axially. Moreover, the second end 2b of the rod may be rounded, as shown in FIG. 13, to facilitate insertion into the elongated recess 6.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

The invention resides not in any one of these features per se, but rather in the particular combination of all of them herein disclosed and claimed and it is distinguished from the prior art in this particular combination of all of its structures for the function specified. It will be apparent to one skilled in the art that the fastener of the present invention is applicable to may types of connection, including, without limitation, audio (sonic), data transfer via cable for serial port, parallel port, and related connections, and fiber optics. For any connection where previously a typical attachment would have been made by a screw and threaded hole, the fastener of the present invention could now be employed. This fastener will work, without any modification being fastener into an existing cable holder in place of the original screw and then inserting it into the original threaded hole, a secure connection can be made.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:
   a. an elongated rod having a central axis, a first end, and a second end;
   b. means for axially biasing the rod which is disposed proximate to the first end;
   c. means for restricting axial movement which is disposed proximate to the second end; and
   d. a solid resilient sleeve having an interior recess therethrough that is suitably sized to accommodate the rod and having a relaxed maximum outer transverse dimension that is less than the smallest transverse dimension of the elongated receiving recess,
      said sleeve being disposed around said rod between the means for axially biasing and the means for restricting axial movement,
      said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
      said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
      whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

2. The tool-less fastener of claim 1, wherein the rod is cylindrical with a circumferential groove disposed proximate to the second end.

3. The tool-less fastener of claim 1, wherein the means for restricting axial movement comprises a second contact element having a central aperture of predetermined radial dimension and wherein the rod is generally cylindrical with a shoulder of increased radial dimension disposed proximate to the second end,
   said shoulder having an outer radial dimension greater than the predetermined radial dimension of the central aperture,
   whereby, said second contact element can be disposed around the rod between the sleeve and the shoulder.

4. The tool-less fastener of claim 1, wherein the means for restricting axial movement comprises a second contact element having a central aperture of predetermined radial dimension and wherein the rod has a taper extending along at least one segment of its length tapering toward the first end of the rod and disposed proximate to the second end of the rod,
   said at least one segment of the rod having a section with an outer radial dimension greater than the predetermined radial dimension of the central aperture,
   whereby, said second contact element can be disposed around the section of the rod with an outer radial dimension greater than the predetermined radial dimension of the central aperture where said second contact element is limited from further axial movement in the direction of the second end of the rod.

5. The tool-less fastener of claim 4, wherein the contact element comprises a second washer.

6. The tool-less fastener of claim 4, wherein the contact element is a second cupped washer having a concave surface disposed proximate to the sleeve.

7. The tool-less fastener of claim 6, wherein the concave surface of the second cupped washer is in a face to face relationship with a distal end of the sleeve.

8. The tool-less fastener of claim 1, wherein the second end of the rod is rounded to facilitate insertion into the elongated recess.

9. The tool-less fastener of claim 1, wherein:
   a. the means for biasing comprises a camshaft and a cam mechanism,
      said cam mechanism is operatively connected to the camshaft;
   b. the rod is cylindrical with a first flattened end and a second flattened end,
      said first flattened end has a transverse opening for receiving the camshaft; and
   c. the means for biasing and the means for restricting axial movement comprise, respectively, a first contact element and a second contact element,
      each of said first contact element and said second contact element has a notched central aperture with one maximum transverse dimension greater than a maximum transverse dimension of the flattened end of the rod, said first contact element being disposed around the rod between the sleeve and the cam mechanism, and said second contact element being disposed around the rod between the sleeve and the second flattened end.

10. The tool-less fastener of claim 1, wherein
   a. the rod has a transverse opening for receiving a camshaft; and
   b. the means for biasing comprises a camshaft and a cam mechanism including a parallel set of cam wheels,
      said cam wheels are operatively connected to the camshaft which is operatively connected to the transverse opening in the rod.

11. The tool-less fastener of claim 10, wherein each of said parallel set of cam wheels comprises:
   a. a peripheral edge having a first segment with a constant radius of curvature and a second segment of varying radii of curvature,
      the radial dimension of the first segment being at least as great as the largest radial dimension of the second segment; and
   b. an exterior surface suitably sized to allow the cam wheels to be grasped between the finger tips of a user.

12. The tool-less fastener of claim 10, wherein the cam mechanism includes a parallel set of cam wheels and a lever arm extending from the parallel set of cam wheels to facilitate rotation of the cam wheels,
   said lever arm having a first exterior surface that is parallel to a second exterior surface,
   said first and second exterior surfaces being suitably size to allow the lever arm to be grasped between the finger tips of a user.

13. The tool-less fastener of claim 10, wherein the cam mechanism includes a parallel set of cam wheels and an extensible lever arm projecting from the parallel set of cam wheels to facilitate rotation of the cam wheels,
   said extensible lever arm being movable between a first position in which the arm is retracted and a second position in which the arm is fully extended,
   said second position of the extensible lever arm being suitably size to allow the lever arm to readily actuated.

14. The tool-less fastener of claim 1, wherein the elongated recess has an interior surface comprising one of a rough surface and a smooth surface.

15. The tool-less fastener of claim 14, wherein the rough surface is threaded.

16. The tool-less fastener of claim 1, wherein the sleeve has a textured exterior surface.

17. The tool-less fastener of claim 1, wherein the relaxed sleeve has a cylindrical outer shape and the elongated receiving recess has a generally cylindrical shape.

18. The tool-less fastener of claim 1, wherein the connection holder comprises a flange.

19. The tool-less fastener of claim 1, wherein the connection holder of the computer cable has a hole for receiving the resilient sleeve, the relaxed maximum outer transverse dimension of the resilient sleeve is less than the smallest transverse dimension of the hole, and the deformed maximum outer transverse dimension is greater than the smallest transverse dimension of the hole,
   whereby, the rod with the relaxed sleeve disposed around it can be introduced to the hole of the connection holder of the computer cable and the receiving recess of one of the computer port connection and the peripheral port connection when the means for axially biasing is disposed in the first position, and the connection holder of the computer cable can be releasably connected to the receiving recess of one of the computer port connection and the peripheral port connection by the radial forces of the deformed sleeve when the means for axially biasing is disposed in the second position.

20. The tool-less fastener of claim 19, wherein the smallest transverse dimension of the hole corresponds generally to the smallest transverse dimension of the elongated receiving recess.

21. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:
   a. an elongated rod having a central axis, a first end, and a second end;
   b. means for axially biasing the rod which is disposed proximate to the first end comprising a first contact element having a central aperture and a mechanism that is rotatingly attached to the rod for axial movement with respect to said rod, and
      said first contact element is disposed around the rod between the sleeve and the rotating mechanism;
   c. means for restricting axial movement which is disposed proximate to the second end; and
   d. a resilient sleeve having an interior recess therethrough that is suitably sized to accommodate the rod and having a relaxed maximum outer transverse dimension that is less than the smallest transverse dimension of the elongated receiving recess,
      said sleeve being disposed around said rod between the means for axially biasing and the means for restricting axial movement,
      said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
      said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
      whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

22. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:

a. an elongated rod having a central axis, a first end, and a second end;
b. means for axially biasing the rod which is disposed proximate to the first end comprising a first contact element having a central aperture and a cam mechanism,
   said cam mechanism is operatively attached to the rod, and
   said first contact element is disposed around the rod between the sleeve and the rotating mechanism;
c. means for restricting axial movement which is disposed proximate to the second end; and
d. a resilient sleeve having an interior recess therethrough that is suitably sized to accommodate the rod and having a relaxed maximum outer transverse dimension that is less than the smallest transverse dimension of the elongated receiving recess,
   said sleeve being disposed around said rod between the means for axially biasing and the means for restricting axial movement,
   said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
   said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
   whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

23. The tool-less fastener of claim 22, wherein the first contact element comprises a first washer.

24. The tool-less fastener of claim 23, wherein the first washer comprises a belleville washer with a concave surface disposed proximate to the sleeve.

25. The tool-less fastener of claim 22, wherein the first contact element is a first cupped washer having a concave surface disposed proximate to the sleeve.

26. The tool-less fastener of claim 25, wherein the concave surface of the first cupped washer is in a face to face relationship with a proximate end of the sleeve.

27. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:
a. an elongated rod having a central axis, a first end, and a second end,
   said rod is cylindrical with a circumferential groove disposed proximate to the second end;
b. means for axially biasing the rod which is disposed proximate to the first end, comprising a second contact element having a central aperture,
   said central aperture has a plurality of inwardly directed radial fins,
   said plurality of fins being flexibly moveable between a static position in which the fins are inwardly directed radially and an dynamic position in which fins flex axially relative to the central axis of the rod to allow one of the first end and the second end of the rod to be inserted in to the central aperture, and
   said plurality of fins being sufficiently resilient to return to the static position when said central aperture is aligned with the circumferential groove of the rod;
c. means for restricting axial movement which is disposed proximate to the second end; and
d. a resilient sleeve having an interior recess therethrough that is suitably sized to accommodate the rod and having a relaxed maximum outer transverse dimension that is less than the smallest transverse dimension of the elongated receiving recess,
   said sleeve being disposed around said rod between the means for axially biasing and the means for restricting axial movement,
   said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
   said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
   whereby, the rod can be inserted in to the central aperture of the second contact element axially flexing the plurality of inwardly directed radial fins until the circumferential groove of the rod is aligned with the central aperture allowing the plurality of fins to elastically regain the static position thereby securing the second contact element axially, and
   whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

28. The tool-less fastener of claim 27, wherein the second contact element comprises a second washer.

29. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:
a. an elongated rod having a central axis, a first end, a second end, and a transverse opening proximate to the first end;
b. means for axially biasing the rod which is disposed proximate to the first end,
   said means for biasing comprises:

(1) a camshaft and a cam mechanism including a parallel set of cam wheels,
said cam wheels being operatively connected to the camshaft,
said camshaft being operatively connected to the transverse opening in the rod, and attached to the rod, and
(2) a first cupped washer having a central aperture and a concave surface disposed proximate to the sleeve,
said first cupped washer being disposed around the rod between the sleeve and the cam mechanism;
c. means for restricting axial movement which is disposed proximate to the second end; and
d. a resilient sleeve having an interior recess therethrough that is suitably sized to accommodate the rod and having a relaxed maximum outer transverse dimension that is less than the smallest transverse dimension of the elongated receiving recess,
said sleeve being disposed around said rod between the means for axially biasing and the means for restricting axial movement,
said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

30. A tool-less fastener extending from a computer cable, for use in connecting the computer cable to one of a computer port connection and a peripheral port connection, said computer cable having a connection holder disposed on a terminal end thereof, and each of said computer port connection and said peripheral port connection having an elongated receiving recess, comprising:
a. an elongated rod having a central axis, a first end, a second end, and a transverse opening proximate to the first end;
b. the connection holder of the computer cable having a hole for receiving a resilient sleeve;
c. means for axially biasing the rod which is disposed proximate to the first end,
said means for biasing comprises:
(1) a camshaft and a cam mechanism including a parallel set of cam wheels,
said cam wheels being operatively connected to the camshaft,
said camshaft being operatively connected to the transverse opening in the rod, and attached to the rod, and
(2) a first cupped washer having a central aperture and a concave surface disposed proximate to the sleeve,
said first cupped washer being disposed around the rod between the sleeve and the cam mechanism;
d. means for restricting axial movement which is disposed proximate to the second end; and
e. a resilient sleeve having an interior recess therethrough that is suitably sized to accommodate the rod and having a relaxed maximum outer transverse dimension that is less than the smallest transverse dimension of the elongated receiving recess,
said sleeve being disposed around said rod between the means for axially biasing and the means for restricting axial movement,
said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
said relaxed maximum outer transverse dimension of the resilient sleeve is less than the smallest transverse dimension of the hole,
said deforming compressive pressure compresses the sleeve axially and expands at least a portion of the sleeve radially relative to the central axis of the rod to a deformed maximum outer transverse dimension that is greater than the smallest transverse dimension of the elongated receiving recess, and the deformed maximum outer transverse dimension is greater than the smallest transverse dimension of the hole,
whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position, and the rod with the relaxed sleeve disposed around it can be introduced to the hole of the connection holder of the computer cable and the receiving recess of one of the computer port connection and the peripheral port connection when the means for axially biasing is disposed in the first position, and the connection holder of the computer cable can be releasably connected to the receiving recess of one of the computer port connection and the peripheral port connection by the radial forces of the deformed sleeve when the means for axially biasing is disposed in the second position.

31. The tool-less fastener of claim 30, wherein the means for restricting axial movement comprises a second contact element having a central aperture,
said central aperture has a plurality of inwardly directed radial fins,
said plurality of fins being flexibly moveable between a static position in which the fins are inwardly directed radially and an dynamic position in which fins flex axially relative to the central axis of the rod to allow one of the first end and the second end of the rod to be inserted in to the central aperture, and said plurality of fins being sufficiently resilient to return to the static position when said central aperture is aligned with the circumferential groove of the rod, whereby, the rod can be inserted in to the central aperture of the second contact element axially flexing the plurality of inwardly directed radial fins until the circumferential groove of the rod is aligned with the central aperture allowing the plurality of fins to elastically regain the static position thereby securing the second contact element axially.

32. The tool-less fastener of claim 30, wherein the second end of the rod is rounded to facilitate insertion into the elongated recess.

33. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:

a. an elongated rod having a central axis, a first end, and a second end,
   said rod having an integral means for restricting axial movement disposed proximate to the second end;

b. means for axially biasing the rod which is disposed proximate to the first end; and d. a resilient sleeve having an interior recess therethrough that is suitably sized to accommodate the rod and having a relaxed maximum outer transverse dimension that is less than the smallest transverse dimension of the elongated receiving recess,
   said sleeve being disposed around said rod between the means for axially biasing and the means for restricting axial movement,
   said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
   said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
   whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

34. A tool-less fastener, for use in connecting a computer cable to one of a computer port connection and a peripheral port connection, said computer cable having a connection holder disposed on a terminal end thereof, and each of said computer port connection and said peripheral port connection having an elongated receiving recess, comprising:

a. an elongated rod having a central axis, a first end, and a second end,
   said rod having an integral means for restricting axial movement disposed proximate to the second end;

b. means for axially biasing the rod which is disposed proximate to the first end,
   said means for biasing comprises a first contact element having a central aperture and a mechanism that is rotatingly attached to the rod for axial movement with respect to said rod, and
   said first contact element is disposed around the rod between the sleeve and the rotating mechanism; and d. a resilient sleeve having an interior recess therethrough that is suitably sized to accommodate the rod and having a relaxed maximum outer transverse dimension that is less than the smallest transverse dimension of the elongated receiving recess,
   said sleeve being disposed around said rod between the means for axially biasing and the means for restricting axial movement,
   said means for axially biasing being movable between a first position in which the sleeve is relaxed having a first pressure that does not substantially exceed a nominal compressive pressure applied to the sleeve by the means for axially biasing and a second position in which a deforming compressive pressure is applied to the sleeve by the means for axially biasing,
   said deforming compressive pressure compresses the sleeve axially and expands at least a portion of the sleeve radially relative to the central axis of the rod to a deformed maximum outer transverse dimension that is greater than the smallest transverse dimension of the elongated receiving recess,
   whereby, the second end of the rod with the relaxed sleeve disposed around it can be projected from the connection holder of the computer cable to the receiving recess of one of the computer port connection and the peripheral port connection when the means for axially biasing is disposed in the first position, and the connection holder of the computer cable can be releasably connected to the receiving recess of one of the computer port connection and the peripheral port connection when the means for axially biasing is disposed in the second position.

* * * * *